No. 723,887. PATENTED MAR. 31, 1903.
W. S. LIVENGOOD.
WHEELED SCRAPER.
APPLICATION FILED APR. 15, 1902.
NO MODEL. 2 SHEETS—SHEET 1.
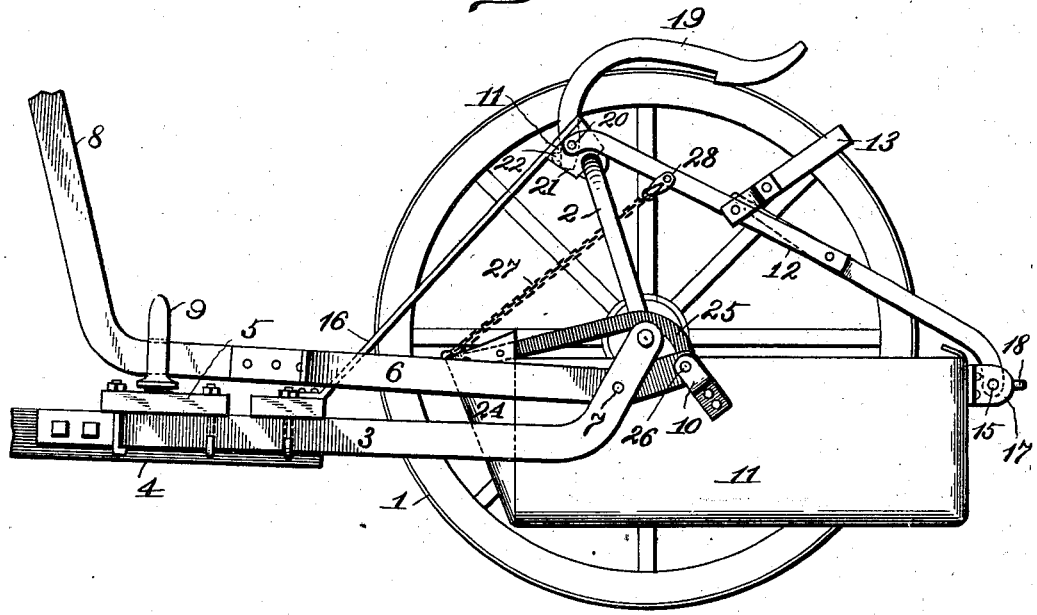
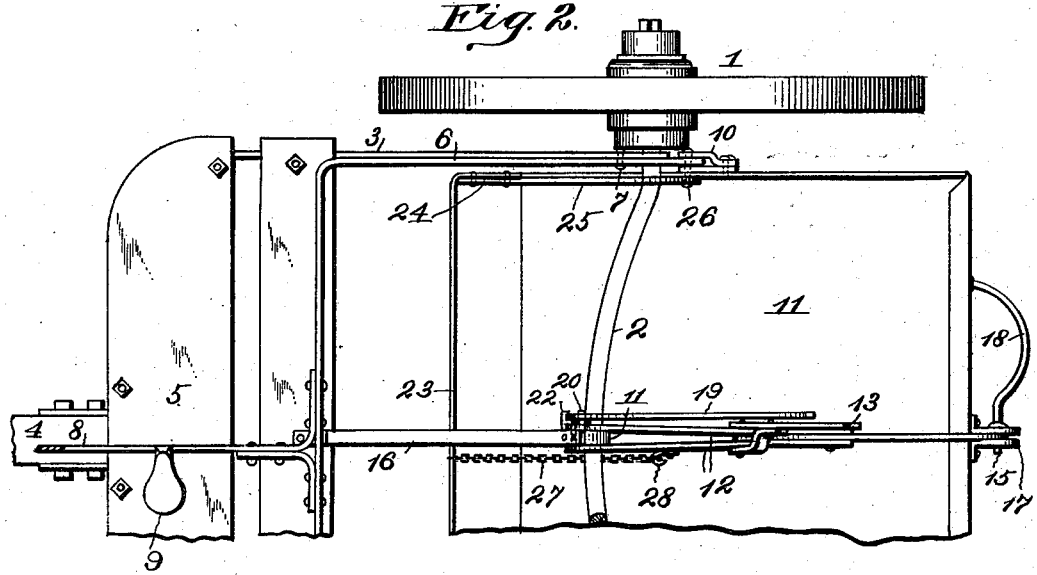
Witnesses:
R. McArthur
G. W. McDougall
Inventor:
W. S. Livengood
By Fischer & Thorpe
Attys.
THE NORRIS PETERS CO., PHOTO-LITHO., WASHINGTON, D. C.

No. 723,887. PATENTED MAR. 31, 1903.
W. S. LIVENGOOD.
WHEELED SCRAPER.
APPLICATION FILED APR. 15, 1902.
NO MODEL. 2 SHEETS—SHEET 2.
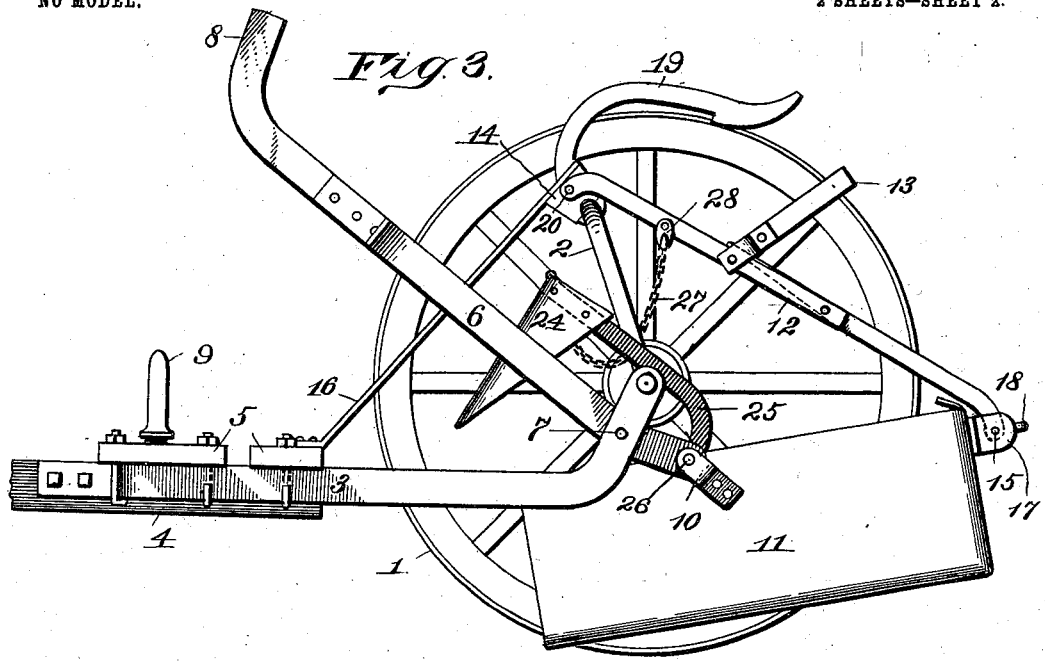
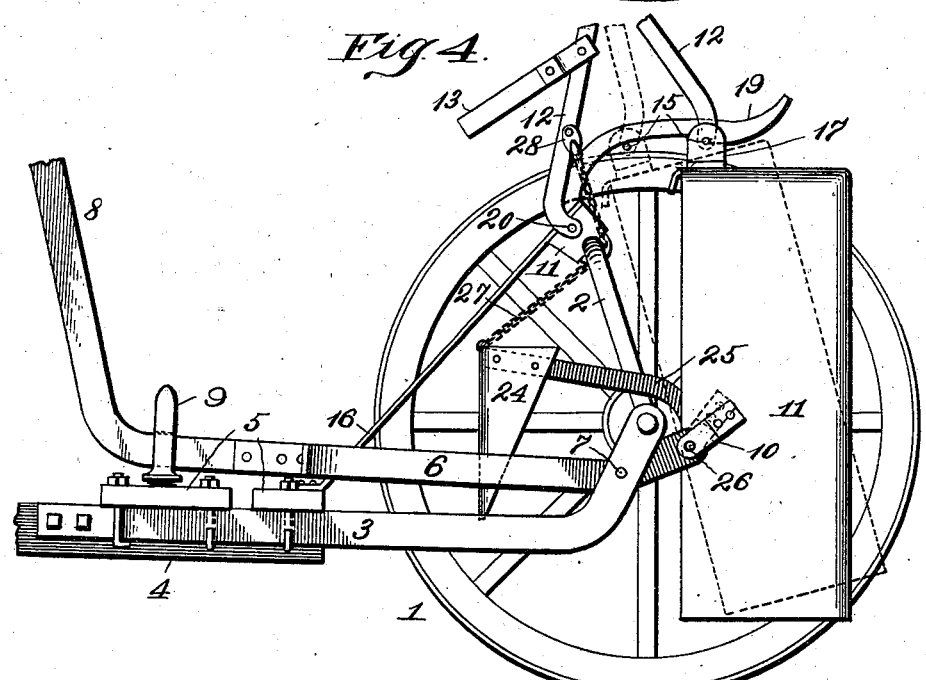
Witnesses:
Inventor:
W. S. Livengood.
By Fischer & Thorpe
Attys.

UNITED STATES PATENT OFFICE.

WINFIELD S. LIVENGOOD, OF KANSAS CITY, MISSOURI, ASSIGNOR TO SMITH & SONS MANUFACTURING CO., OF KANSAS CITY, MISSOURI.

WHEELED SCRAPER.

SPECIFICATION forming part of Letters Patent No. 723,887, dated March 31, 1903.

Application filed April 15, 1902. Serial No. 103,004. (No model.)

*To all whom it may concern:*

Be it known that I, WINFIELD S. LIVENGOOD, a citizen of the United States, residing at Kansas City, in the county of Jackson and State of Missouri, have invented certain new and useful Improvements in Wheeled Scrapers, of which the following is a specification.

My invention relates to new and useful improvements in wheeled scrapers; and my object is to hinge the end-gate to the scraper-pan in such a manner that it will be instantly raised a considerable distance above the front end of the scraper-pan when the latter is depressed for loading or dumping. Heretofore in scrapers of this type it has been customary to secure the end-gate to a pair of arms hinged to the pan and provide its side walls with lugs which overlap the bail, so that when the latter was raised to load or dump the pan the end-gate would be elevated therewith. The objection to this form of construction resulted from the fact that as the bail is raised rather slowly and seldom to a point above forty-five degrees when loading the end-gate would not be elevated sufficiently high or rapid to clear the loose soil, and because of this interference the scraper would have to travel a considerable distance before the pan would fill. This resulted in a loss of time and where the distance for loading was short resulted in the pan only partly filling. Also in dumping the slow upward movement of the end-gate retarded the discharge of the dirt, with the consequence that it would be scattered along the way a considerable distance before the pan was finally brought to an upright position. Then after the pan was locked in an upright position the end-gate would be suspended so near the ground that it would interfere with objects in the path of the scraper. By extending the arms, which carry the end-gate, over the axle it will be instantly raised a sufficient height to clear the soil when the pan is depressed for loading or dumping and will in no way interfere with either operation.

Another advantage which I obtain by my improvements is that after the pan has been locked in an upright position, ready for traveling on the road, the end-gate, instead of depending from the bail and hanging down in the way of obstacles on the road, is suspended above the draft-bars and will therefore clear any object over which they will pass.

A further object is to hold the pan when in an upright position in such a way that its lower end is free to swing backward and upward far enough to clear any ordinary-sized obstacle it may encounter on the road, and thus obviate the necessity of pulling the scraper over said obstacle or dragging it along the road.

With these objects in view the invention may be said to consist in certain novel features of construction and arrangement, hereinafter described, and pointed out in the claims.

Referring to the accompanying drawings, which illustrate the invention, Figure 1 represents a side elevation of the scraper in position for carrying a load. Fig. 2 is a broken plan view of same. Fig. 3 is a side elevation showing the position of the end-gate when the scraper is loading. Fig. 4 is a side elevation showing the position of the end-gate when the scraper is dumped.

Similar numerals refer to similar parts throughout the several views.

In constructing the scraper I employ carrying-wheels 1, mounted upon the opposite terminals of an arched axle 2, provided with draft-bars 3, which are bolted at their forward ends to a tongue 4 and carry the usual platform 5.

6 indicates a bail fulcrumed at 7 to the rear portions of the draft-bars and provided with a hand-lever 8, adapted to be locked down by a latch 9 in the usual manner. The rear ends of the bail are pivotally secured to ears 10, riveted to the opposite sides of the scraper-pan 11, the rear portion of which is normally supported by a folding brace 12, controlled by a locking-lever 13 and pivotally secured at its opposite ends to a block 14 and a rod 15. Block 14 is secured to the upper central portion of the axle, which latter is supported by a brace 16, secured at its opposite ends to the block and the platform. Rod 15 is secured at its opposite ends to ears 17 and the rear wall of the pan and is curved to form a handle 18, by which the rear end of the pan may be elevated.

When traveling on the road or back from the dump, the pan is loosely held in an upright position by an elongated hook 19, which automatically engages rod 15 when the pan is raised up. Said hook is pivoted to pin 20, and its movement is limited by its end 21 contacting with lugs 22 on the axle. Its under side is curved, as shown, to permit the upper end of the pan to swing forwardly and its lower end to swing back and over any ordinary-sized obstacle which it may strike on the road. It is to allow this movement of the pan that the axle is held in a slightly-inclined position. In addition to providing for this movement the other important feature of the invention resides in the manner in which the end-gate employed for closing the front of the pan is supported and operated. Said end-gate consists of a transverse wall 23, provided with triangular end portions 24, bent at right angles thereto and adapted to close against the vertical front portion of the pan when the scraper is loaded, and thus hold the dirt therein until dumped.

The end-gate is carried by two arms 25, riveted at their forward terminals to the upper part of the triangular end portions 24 and extend backwardly over the axle and then curve downwardly to pins 26, on which they are pivotally secured.

When the pan is in an upright position, as shown by Fig. 4, the end-gate is held up by a chain 27, secured at its opposite ends to the upper central portion of the pan, and a hook 28, pivotally secured to the upper portion of the folding brace.

By extending arms 25 over the axle the end-gate is immediately raised a considerable distance above the front of the pan when the latter is lowered for loading or dumping, and consequently does not retard said operation by hanging down in the way of the soil. When the pan is in an upright position, the end-gate is held a sufficient distance above the ground by chain 27 to clear any obstacle over which the platform will pass.

Having thus described the invention, what I claim as new, and desire to secure by Letters Patent, is—

1. In a wheeled scraper, an axle, a suitable pan, an end-gate for closing one end of the latter, and a pair of arms extending over the axle and rigidly secured at their forward terminals to the end-gate, and pivotally secured at their rear ends to the pan, substantially as described.

2. In a wheeled scraper, an axle, a pan, an end-gate adapted to close one end of the pan, and arms, extending over the axle which are pivoted at their rear ends to the pan, and carry the end-gate at their opposite terminals, substantially as described.

3. In a wheeled scraper provided with a pan, an axle, a folding brace, and an end-gate; a chain secured at its opposite ends to the folding brace and the end-gate, and adapted to retain the latter in an elevated position by being thrown into engagement with the axle by the folding brace, when the pan is dumped, substantially as described.

4. In a wheeled scraper provided with a pan, an end-gate for closing one end of said pan, and a chain secured at its opposite ends to a suitable part of the machine and the end-gate, in such a manner as to retain the latter in an elevated position when the pan is dumped, substantially as described.

5. In a wheeled scraper, a pan, an axle, an end-gate comprising a transverse wall having triangular end portions bent at right angles thereto, a pair of arms, extending over the axle and secured at their opposite ends onto the side of the pan and the end-gate in such a manner as to elevate the latter above the front of the pan when the latter is depressed, substantially as described.

6. In a wheeled scraper provided with a pan adapted to be operated by a hand-lever, the combination of an end-gate, comprising a transverse wall with triangular end portions bent at right angles thereto and adapted to close against the vertical front portion of the pan, a pair of arms rigidly secured at their forward ends to the upper portions of the triangular walls, and which extend back over the axle and then curve downwardly, pins projecting inwardly from the side walls of the pan to which the rear ends of the arms are pivotally connected, and a chain for holding the end-gate in an elevated position when the pan is upright, which is secured at its opposite ends to the end-gate and the folding brace of the scraper, substantially as described.

7. In a wheeled scraper, a pan, a rod secured to the rear wall thereof, a forwardly-inclined arched axle, a block rigidly secured thereto, and an elongated hook pivotally secured at its forward end to the block and adapted to loosely engage the rod when the pan is upright so its lower end may swing backwardly over obstacles in the road, substantially as described.

In testimony whereof I affix my signature in the presence of two witnesses.

WINFIELD S. LIVENGOOD.

Witnesses:
F. G. FISCHER,
G. Y. THORPE.